United States Patent

[11] 3,594,012

[72] Inventors Robert L. Whittaker
Gwynedd Manor;
Joseph Donofry, Broomall; Thorval L. Berg, Warminster, all of, Pa.
[21] Appl. No. 833,988
[22] Filed June 17, 1969
[45] Patented July 20, 1971
[73] Assignee Greene Tweed & Co., Inc.
North Wales, Pa.

[54] SEALING DEVICE
2 Claims, 4 Drawing Figs.

[52] U.S. Cl. .................................................. 277/208
[51] Int. Cl. ................................................. F16j 15/32
[50] Field of Search .......................................... 277/205, 206, 212, 212 C, 212 F, 212 FB, 235, 207, 208

[56] References Cited
UNITED STATES PATENTS
3,477,731  11/1969  Workman ................... 277/212 X Primary Examiner—Robert I. Smith
Attorney—Seidel, Gonda and Goldhammer ABSTRACT: A sealing device includes an annular body having an inner periphery and an outer periphery. The annular body includes upstanding legs which define a generally U-shaped groove therebetween. One of the legs includes surfaces converging to an edge. The surfaces define an included angle of approximately 100—120°. The edge is on the inner periphery of the annular body and lies along a substantially solid width of the annular body in a radial direction. The nadir of the U-shaped groove is maintained above or no more than 10 percent of the overall height of the sealing device below said edge. The substantially solid width in a radial direction provides more sealing pressure at the edge and significantly minimizes leakage of fluid past the sealing device. The material of the annular body may be any suitable resilient gasketing material which has a compression modulus of 200 p.s.i. or about at 10 percent compression.

PATENTED JUL 20 1971 3,594,012
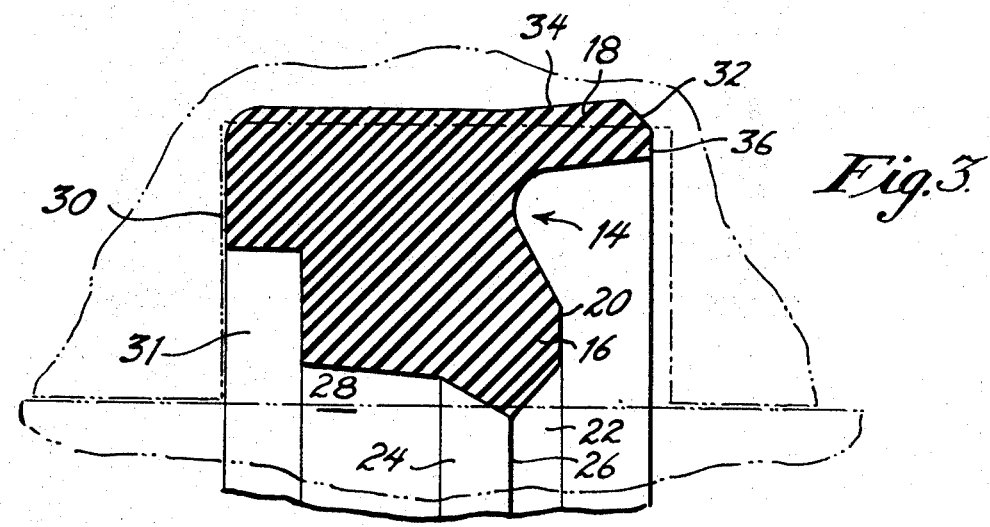
Fig.3.
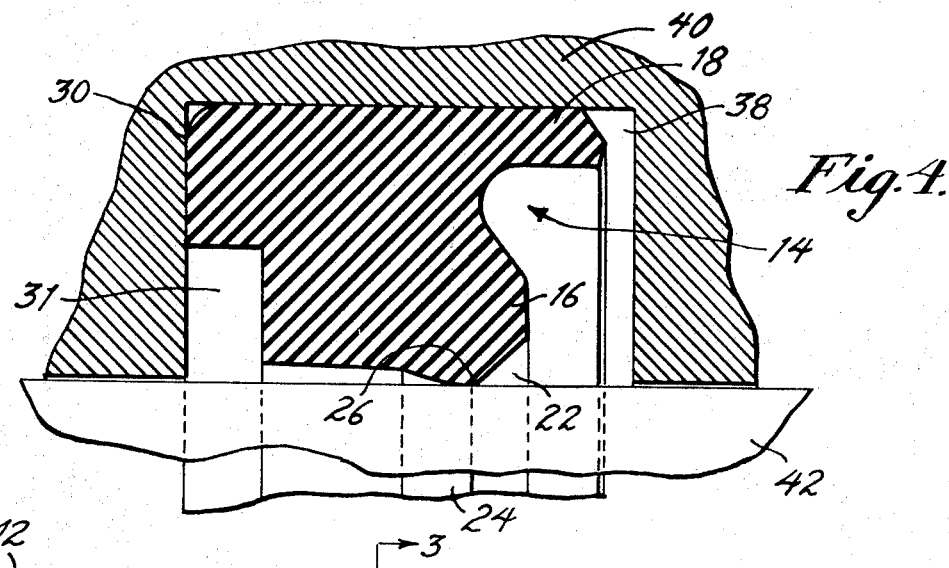
Fig.4.
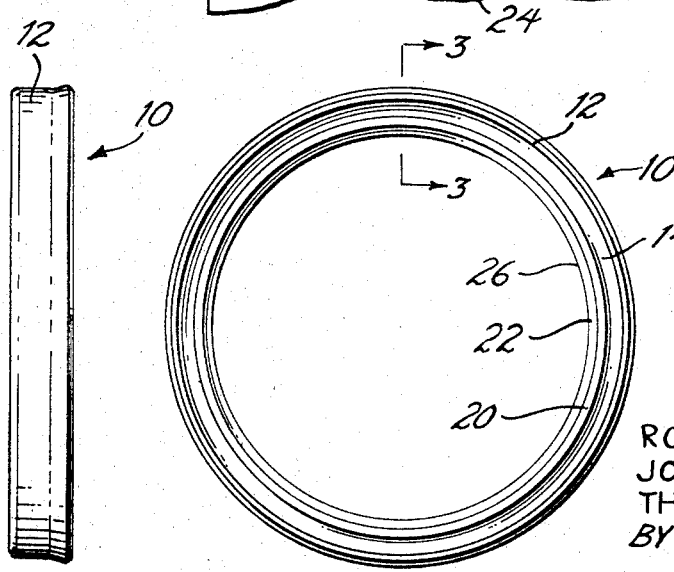
Fig.1.
Fig.2.
INVENTORS.
ROBERT L. WHITTAKER
JOSEPH DONOFRY
THORVAL L. BERG
BY
ATTORNEYS.

3,594,012

SEALING DEVICE

The present invention relates to a sealing device and more particularly to a sealing device including an upstanding leg having converging surfaces on a peripheral surface thereof to provide a sharply defined edge lying along a substantially solid width of the sealing device in a radial direction to thus permit more effective sealing.

The use of sealing devices to provide an effective fluid seal between machine elements wherein one machine element is relatively movable with respect to the other machine element is well-known. It has been suggested that U-rings should be utilized to provide effective seals. See, for example, U.S. Pat. No. 3,167,323. Many conventional sealing rings provide a rounded or flat sealing surface since it was believed that such a surface would prolong the life of the sealing ring. Where it was suggested that a sharp, peripheral edge be utilized to effect a seal, the seal depended primarily upon the hinging action of one of the legs of the U-ring in order to provide sufficient sealing pressure. It was believed that such hinging action provided a superior seal.

It is an object of the present invention to overcome the deficiencies of prior art sealing devices discussed above.

It is another object of the present invention to provide a sealing device having an upstanding leg having surfaces converging to an edge which lies along a substantially solid width of the sealing device in a radial direction.

It is still a further object of the present invention to provide a sealing device composed of material having a compression modulus of 200 p.s.i. or above at 10 percent compression so that the ring will out perform conventional seals.

The above and other objects will appear hereinafter.

The above and other objects are accomplished by means of the present invention. A sealing device is provided which includes an annular body having an inner periphery and an outer periphery. The annular body includes upstanding legs which define a groove therebetween. One of the legs on a peripheral surface of the annular body includes surfaces converging to an edge. The surfaces defined an included angle of approximately 100°—120°. The sealing device is utilized to provide an effective fluid seal between machine elements wherein one machine element is relatively movable with respect to the other machine element. While the drawings disclose the sealing device used as a rod seal, it is to be understood the sealing device could also be utilized in a groove in a piston. When used as a rod seal, the movable machine element will initially contact the edge of the leg of the annular body. Hence, the edge will lie on the peripheral surface of the annular body which contacts the movable machine element. The edge lies along a substantially solid width of the annular body in a radial direction. The substantially solid width in a radial direction provides substantially more sealing pressures at the edge and significantly increases the quality of performance of the sealing device.

The material of the annular body may be any suitable resilient gasketing material which has a compression modulus of 200 p.s.i. or above at 10 percent compression. Suitable materials include carboxylated Buna N and polyurethane. Carboxylated Buna N and polyurethanes are exemplary only and any gasketing material which meets the aforementioned specifications may be used in the present invention.

For the purpose of illustrating the invention, there is shown in the drawings a form which is presently preferred; it being understood, however, that this invention is not limited to the precise arrangements and instrumentalities shown.

FIG. 1 is a front elevation view of the sealing device of the present invention;

FIG. 2 is a side elevation view of the sealing device of the present invention;

FIG. 3 is an enlarged section view taken along the line 3-3 of FIG. 1; and

FIG. 4 is a sectional view similar to FIG. 2 showing the sealing device in a compressed state.

Referring now to the drawings in detail wherein like numerals indicate like elements throughout the several views there is shown in FIGS. 1—4, a sealing device embodying the principles of the present invention designated generally as 10. The sealing device 10 includes an annular sealing ring 12.

One end face of the ring is split at a generally U-shaped groove 14 so as to define an inner leg 16 shorter and thicker than an outer leg 18. The inner leg 16 has a flat top end face 20 and side surfaces 22 and 24 which converge to an edge 26. The side surfaces 22 and 24 define an angle of approximately 100°—120°. In the preferred form of the invention the included angle is 110°.

The interior peripheral surface 28 of the sealing ring 12 is provided with a slight bevel sloping away from the edge 26 and terminates in an end face 30 of the ring 12. The end face 30 of the ring 12 may be provided with a groove 31 adapted to receive a backup nonextrusion ring. However, the use or elimination of such a backup nonextrusion ring does not materially affect the results obtained by utilization of the sealing device of the present invention. If no backup ring is to be utilized, the groove 31 can be eliminated.

Outer leg 18 has a bevel 32 at the intersection of its outer periphery 34 and end face 36. The edge 26 lies along a substantially solid width of the annular sealing ring in a radial direction. In the preferred embodiment the edge 26 will be along a solid width of the sealing ring in a radial direction. However, it has been found that the beneficial effects of the present invention can be obtained by maintaining the nadir of the U-shaped groove above or no more than 10 percent of the overall height of the sealing device low the edge 26.

In the preferred embodiment the groove 14 does not extend to a depth wherein it would interfere with the solid width of the ring 12 along a radius of the ring extending through edge 26. The sealing device of the present invention may advantageously be utilized to provide an effective seal between machine elements wherein one machine element is relatively movable with respect to the other machine element. Hence, the sealing device may be utilized to effect a rod or a position seal.

FIG. 3 illustrates the sealing device 10 in an uncompressed state showing the relationship of the sealing device to machine elements which are shown in phantom line. In FIG. 4, sealing device 10 is shown in a compressed state installed in a groove 38 in a housing 40 juxtaposed to a rod 42. The sealing device 10 will assume substantially the position shown in FIG. 4 when inserted into the groove 38. It has been found that by providing the edge 26 along a substantially solid width of the annular sealing ring 12 in a radial direction, leakage of fluid past the sealing ring is minimal.

The device 10 may provide for high temperature, high pressure sealing between any two relatively movable members having slidably fitted complementary cylindrical working surfaces with a clearance gap therebetween, such as housing 40 and rod 42.

The material of the sealing device may be any suitable resilient gasketing material which has a compression modulus of 200 p.s.i. or above at 10 percent compression. Materials which have been found suitable for use in the present invention include carboxylated Buna N and polyurethanes. Such materials are exemplary only and any gasketing material with meets the aforementioned specifications may be used in the present invention. The material selected would depend upon the application to which the sealing device is to be put.

A suitable carboxylated Buna N for the annular sealing ring 12 is sold commercially as Hycar 1072 by B. F. Goodrich Chemical Company. The properties of Hycar 1072 are fully set forth in application Ser. No. 724,950 filed Apr. 29, 1968 and assigned to the same assignee.

I do not fully understand why the sealing device 10 performs so well. I suspect that the provision of the sharp edge 26 lying along a substantially solid width of the annular body in a radial direction is an extremely important factor.

The substantially solid width provides substantial compressive forces at the edge 26 which accounts for the excellent performance of the sealing device. Furthermore, wherein the nadir pf the U-shaped groove is within 10 percent of the overall height of the sealing device below the edge 26 the hinge force is substantial and cooperates with the compressive forces to provide an effective seal. When the nadir of the U-shaped groove lies along or is above a radius through the edge 26 only compressive forces serve to effect the seal and force the edge 26 into contact with the surface to be sealed it has been found that the sealing device of the present invention has substantially no leakage until failure occurs. The present invention may be embodied in other specific forms without departing from the spirit or essential attributes thereof.

I claim:

1. A U-ring sealing device for effecting a seal between two relatively movable members comprising an annular body having an inner leg and an outer leg, said outer leg having one surface lying along a first periphery of said device, said inner leg having one surface lying along a second periphery of said device, said inner leg and said outer leg defining a generally U-shaped groove therebetween, one of said legs including further surfaces converging to an edge of contact with one of said relatively movable members, the other of said legs having a portion for contact with the other of said relatively movable members, said edge lying along a substantially solid width of said sealing device along a radius with respect to the axis of said annular body, the nadir of said U-shaped groove being within a range of immediately above said radius in one axial direction to along the radius in the opposite axial direction to along the radius in the opposite axial direction whereby the solid width of the material along the radius and the hinging action of said legs facilitate the seal, the nadir of said U-shaped groove being closer to the one of said peripheries than the other of said peripheries of the device and wherein one leg is substantially thinner than the other.

2. A U-ring sealing device as set forth in claim 1 wherein said converging surfaces define an included angle of approximately 110° and said device is composed of a material having a compression modulus of at least 200 p.s.i. at ten percent compression.